(12) United States Patent
Dunlop et al.

(10) Patent No.: US 7,751,326 B2
(45) Date of Patent: Jul. 6, 2010

(54) MOBILE COMMUNICATIONS NETWORKS

(75) Inventors: John Dunlop, Glasgow (GB); Demessie Girma, Glasgow (GB); James Menzies Irvine, Troon (GB); Robert Caddell Atkinson, Clydebank (GB); Gwenael Le Bodic, Puteaux (FR)

(73) Assignee: University of Strathclyde, Glasgow (GB)

( * ) Notice: Subject to any disclaimer, the term of this patent is extended or adjusted under 35 U.S.C. 154(b) by 1650 days.

(21) Appl. No.: 10/221,821

(22) PCT Filed: Mar. 16, 2001

(86) PCT No.: PCT/GB01/01203
§ 371 (c)(1),
(2), (4) Date: Jan. 31, 2003

(87) PCT Pub. No.: WO01/69961
PCT Pub. Date: Sep. 20, 2001

(65) Prior Publication Data
US 2004/0203796 A1     Oct. 14, 2004

(30) Foreign Application Priority Data
Mar. 16, 2000  (GB) ................................ 0006230.7

(51) Int. Cl.
H04L 12/26  (2006.01)
H04L 29/08  (2006.01)
H04W 4/00   (2009.01)
H04W 40/00  (2009.01)

(52) U.S. Cl. ...................... 370/235; 370/252; 370/338; 370/395.21; 370/469; 455/445

(58) Field of Classification Search ................. 370/352, 370/514, 331, 229, 349, 328, 235, 252, 338, 370/395.21, 469; 455/445
See application file for complete search history.

(56) References Cited

U.S. PATENT DOCUMENTS 5,838,671 A * 11/1998 Ishikawa et al. ............ 370/335
5,953,666 A *  9/1999 Lehtimaki ................... 455/439

(Continued)

FOREIGN PATENT DOCUMENTS

EP        0 946 008        9/1999

(Continued)

OTHER PUBLICATIONS

Gwenaël Lebodic, James Irvine, Demessie Girma and John Dunlop; *Dynamic Bearer Selections Schemes in an Adaptive Tetra Resource Manager and Their Influence on QoS*; The Institution of Electrical Engineers; 2000; pp. 8/1-8/5; IEE; Savoy Place, London, UK (XP-000986274).

(Continued)

Primary Examiner—Alpus H Hsu
(74) Attorney, Agent, or Firm—Alston & Bird LLP

(57) ABSTRACT

A mobile communications system comprising a radio access network having a multiplicity of network sites organised in a multi-layered hierarchy and a traffic flow management system for controlling the routing of traffic flow through the network. The management system trades resource at the various network sites against a plurality of user Quality of Service parameters to achieve required contractual levels of commitment to a multiplicity of users.

4 Claims, 6 Drawing Sheets

U.S. PATENT DOCUMENTS

| | | | | |
|---|---|---|---|---|
| 6,081,534 | A * | 6/2000 | Sipila | 370/466 |
| 6,097,722 | A * | 8/2000 | Graham et al. | 370/395.21 |
| 6,134,230 | A * | 10/2000 | Olofsson et al. | 370/337 |
| 6,157,927 | A * | 12/2000 | Schaefer et al. | 1/1 |
| 6,289,220 | B1 * | 9/2001 | Spear | 455/436 |
| 6,396,820 | B1 * | 5/2002 | Dolan et al. | 370/328 |
| 6,728,270 | B1 * | 4/2004 | Meggers et al. | 370/514 |
| 6,856,676 | B1 * | 2/2005 | Pirot et al. | 379/201.01 |
| 7,023,825 | B1 * | 4/2006 | Haumont et al. | 370/338 |
| 7,068,623 | B1 * | 6/2006 | Barany et al. | 370/329 |
| 7,072,329 | B2 * | 7/2006 | Willars et al. | 370/352 |
| 7,319,673 | B1 * | 1/2008 | Briscoe et al. | 370/252 |
| 2004/0010592 | A1 * | 1/2004 | Carver et al. | 709/226 |

FOREIGN PATENT DOCUMENTS

WO     WO-99/05828     2/1999

OTHER PUBLICATIONS

Gwenaël Lebodic, James Irvine and John Dunlop; *Resource Cost and QoS Achievement in a Contract-Based Resource Manager for Mobile Communications Systems*; IEEE; May 17, 2000; pp. 392-397 (XP-002166920).

James Irvine and John Dunlop; *Simulation Tool for the Assessment of Adaptive Techniques to Improve the Tetra Air Interface*; The Institution of Electrical Engineers; 2000; pp. 7/1-7/6; IEE; Savoy Place, London, UK (XP-000986275).

International Search Report for PCT/GB01/01203 completed May 15, 2001.

\* cited by examiner

QoS Editor / Expert Mode

Application Type
- ○ Interactive Speech
- ○ Audio (No Interaction)
- ◉ Video Conferencing
- ○ Video (No Interaction)
- ○ World Wide Web
- ○ File Transfer Protocol
- ○ File Download (Bulk Transfer)
- ○ Other

Non Performance Properties
- Price
- Performance Commitment
- Terminal Compatibility: ☐ Radio  ☐ Satellite
- Protocol Compatibility: ☐ HTTP  ☐ UDP  ☐ TCP  ☐ IP

Audio
- Noise
- Echo
- Distort
- Clipping
- Crosstalk

Video
- Motion
- Resol
- Distort
- Tiling
- Colour

Data
- Continuous Media
  - Delay
  - Corrupt
  - Throughp
- Discrete Media
  - Size [    ] Bytes

Synchronisation
- Lip Synchronisation
- Spatial Synchronisation
- Interaction Delay

Editor Mode
- ◉ Expert
- ○ Intermediary
- ○ Standard

[New Profile] [Open Profile] [Save Profile] [Restore Default Values] [Exit]

Fig. 6

QoS Editor / Basic Mode

Session Properties
- Price
- Quality

[Exit]

Fig. 7

MOBILE COMMUNICATIONS NETWORKS

TECHNOLOGICAL FIELD

This invention is concerned with the control of resources in mobile communications systems. In particular the invention allows for the management of the trade-off between radio resources and Quality of Service (QoS), and more particularly, the commitment which can be given to defined QoS parameters.

BACKGROUND

In mobile wireless communications systems user terminals (e.g., mobile phones) are able to move. This means that communication requirements will vary from time to time and from place to place, and also that the communication channel over which information is sent will vary in quality over time. Various techniques have been designed to allow for efficient use of the physical air interface when this occurs, including (but not limited to) handover (where the wireless link is changed from one base site to another), macrodiversity (where a link is maintained with two or more base sites at the same time), Dynamic Channel Allocation (DCA) where the air interface resources available to different base sites are pooled and shared out between the sites dynamically depending on current demand, Link Adaptation (where the channel coding is changed in response to the channel quality) Adaptive Modulation (where the modulation is changed in response to the channel quality) and Adaptive Power Control (APC) where the transmission power is changed in response to the channel quality. These different techniques all trade resource on the air interface against quality of the user data stream (the user Quality of Service), and therefore have to be controlled in a coordinated manner. However, efficient control of a system with so many variables is very difficult.

The generic definition of Quality of Service (QoS) is "The collective effect of service performances which determine the degree of satisfaction of a user of the service". The satisfaction of the user depends significantly on the service being considered. For example, QoS measures for speech would include clipping (loss of the start of speech bursts), echoes, crosstalk, distortion, acoustic noise, quantisation noise, and overall signal to noise ratio. For a video service, the QoS parameters would include block distortion, blurring, edge busyness (distortion concentrated at the edge of objects, like edges shimmering), jerkiness, tiling or pixelation, frame freezing, or colour cycling (where colour stability is lost, and colours cycle through a range of hues).

While there are a large number of different QoS measures which are service dependent, it is possible at the transmission level of the system to map these different measures to generic QoS measures related to the network capabilities. These QoS measures are:

- bit rate, both in terms of mean bit rate (throughput) and variation of bit rate (burstiness);
- delay, both in terms of absolute delay (network transit delay) and delay variation (jitter);
- data corruption, in terms of Bit Error Rate (BER) and Frame Erasure Rate (FER) (where packets are lost or dropped rather than received with error).

BRIEF SUMMARY

According to the present invention there is provided a mobile communications system comprising a radio access network having a multiplicity of network sites, and a traffic flow management system for controlling the routing of traffic flows through the network, wherein the management system is adapted to trade resource at the various network sites against a plurality of user Quality of Service parameters to achieve required contractual levels of commitment to a multiplicity of users.

The invention allows for the management of the trade-off between resources and QoS and, in particular, the commitment which can be given to defined QoS parameters. This enables network operators to converge their communication technologies by enabling the selection of the air interface technology that will best serve the user requirements dynamically.

By way of example in an embodiment the present invention allows the high level control functions of a communications system to choose between different air interface technologies and cell types in a cost effective manner in order to minimise resource use and the cost of providing the service. This is achieved by two key features: the definition of the commitment which is mapped between entities, and a division of control functionality of the management system between three separate entities, one of which is responsible for the data flow wherever it is within the network, a second one of which is responsible for a specific link or network site, and the third one of which is responsible for a specific transmission medium or air interface. This allows devolution of air interface specific functions to low level entities and allows mapping of QoS parameters and commitment levels in a practical and achievable fashion.

The radio access network is preferably organised in a multi-layer hierarchy of network sites and by virtue of the present invention the upper layers of the network can specify not only the Quality of Service they wish to obtain, but also the reliability of the connection in terms of the lower (transport) layers' ability to maintain this quality (the commitment), and furthermore allows the network to cost this commitment.

It is preferred to utilise an explicit trade-off between cost and reliability so that the user can choose the level of reliability required and the communication of QoS requirements to the lower layers in the form of standardised contracts which are independent of the air interface.

In combination with the division into separate entities, these requirements are mapped to transmission medium or air-interface specific requirements at the low levels whilst commitment levels offered by the transmission medium or air-interface are mapped back to the upper layers in a consistent format across different air interfaces so that application level functions maintain QoS without requiring explicit details of the low level functionality. This allows for:

the effective management of resources between different types of communications technologies and air interfaces within the same network;

costs of service for different areas and air interfaces to be reported and the optimal choice made (either to minimise cost of service or to maximise revenue for the network);

the practical implementation of such decision-making mechanisms in a devolved manner allowing dynamic selection of the most cost effective technology of a particular mobile at a particular time;

the convergence of telecommunications technologies expected in future wireless communications systems.

Where the upper network layers express their QoS requirements in service specific forms, these will be mapped in a Flow Controller (FC) forming part of the management system to the generic QoS requirements. However, usually the user application will undertake this conversion. The user could guide this conversion by given information on the quality required, for example a graphical interface of tools could be used at the application layer by users, network operators and service providers in order to specify a certain level of subjective QoS which is used to form the QoS requirements. These tools would be used by users to specify the level of QoS required for a communications session such as an Internet connection or a video-conferencing application. These tools could be developed for users or service providers by third parties who would tailor users and service agents for a fee. As an alternative, service providers will be able to pre-define off-line sets of contract types using the most complete tools. The pre-defined contract types would then be provided to users as part of subscription packages. From these contract types, contract instances will be derived and used on behalf of subscribers for requests to the FC.

The commitment is a measure of the capability of the network infrastructure to maintain the contract as agreed and indicates the probability that the network infrastructure will have to terminate or renegotiate the contract.

BRIEF DESCRIPTION OF THE SEVERAL VIEWS OF THE DRAWINGS

These and other aspects of the invention will become apparent from the following description taken in combination with the drawings in which FIG. 1 schematically shows a management system forming part of a mobile communications system according to the present invention;

FIGS. 6 and 7 show graphical interface of tools for use with the management system of FIG. 1;

DETAILED DESCRIPTION

Figure 1:
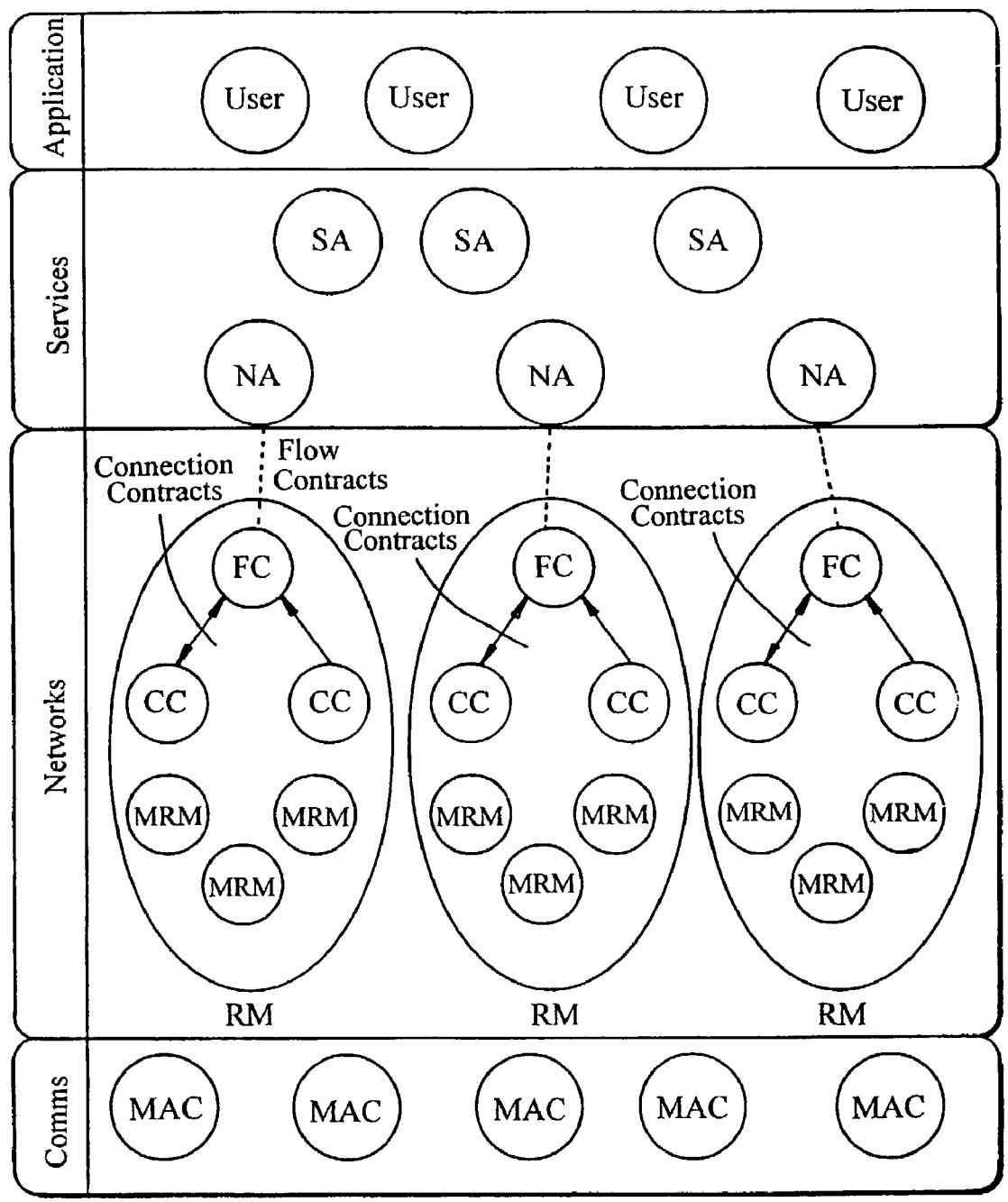
Figure 2:
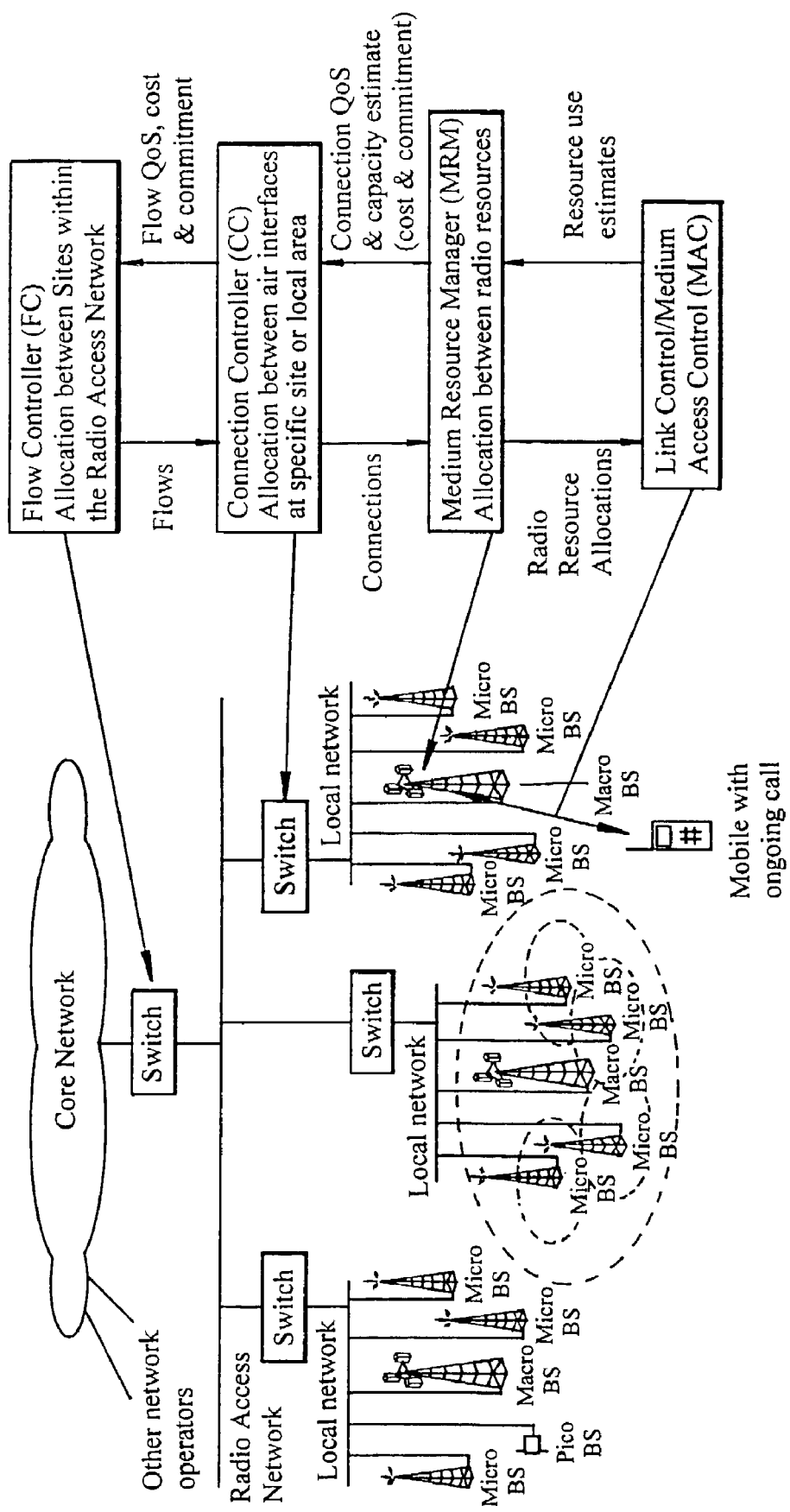
FIG. 2 shows the elements of the FIG. 1 management system mapped onto a radio access network organised in a multi-layered hierarchy.

As is shown in FIG. 1 the management system is composed of four layers. The lowermost or Communications layer comprises a plurality of Medium Access Control (MAC) entities which as shown in FIG. 2 are mapped onto a radio access network to control the link between a users mobile and a radio cell.

Above the Communications layer the management system has a Network Pager which comprises groups of cooperating distributed entities FC (Flow Controller), CC (Connection Controller) and MRM (Medium Resource Manager) together functioning as a Resource Manager (RM). These entities are shown in FIG. 2 mapped onto the radio network.

Above the Communications layer is a Services layer formed by various Service Agents (SA) and Network Agents (NA), and above that is the Applications layer formed by the users.

By way of comparison with a management system operating according to the 7 layer open systems interconnection (OSI) system the Communications Layer relates to Layer 1 (Physical) and Layer 2 (Data Link); the Networks Layer relates to Layer 3 (Network); the Services Layer relates to Layer 4 (Transport) and Layer 5 (Session) and Layer 6 (Presentation); the Application layer relates to Layer 7 (Application).

The exact functionality of the Services layer is not the concern of this invention, but functionality in the Services layer carried out on behalf of the network operator is termed a network agent (NA). Service Agent (SA), is the name given here to functional entities in the services layer operating on behalf of the service provider.

The Networks Layer utilises a hierarchical structure of the three entities FC, CC and MRM which co-operate to provide resource management functions. These entities are:

Flow Controller (FC): This is the highest layer, and controls activities within the network relating to the management of an individual flow. A flow is a part of a communication within a call which can be treated separately. For example, a voice call may consists of a downlink (network to mobile terminal) flow and an uplink (mobile terminal to network) flow.

Connection Controller (CC): A CC is responsible for the operation of a flow at a particular location within the network. As a mobile moves through the network it may hand over to different CCs under the control of a single FC.

Medium Resource Managers (MRM): A MRM is the lowest layer of the resource management hierarchy, and controls the allocation and maintenance of resources for flows on the air interface of the associated radio port (radio transceiver allowing access to the network), or the physical layer of a fixed network link. Different radio technologies, such as cellular, satellite and cordless, have different MRMs, which insulate the operation of CC from the details of the transmission medium. This allows for practical resource negotiation between different transport mechanisms. Each MRM has a resource table listing resources currently allocated to that MRM, and maintains an estimate of the resources required to maintain the connections allocated to it and the likelihood that the available resources will prove insufficient for these connections in the future, bearing in mind channel conditions. This allows the management system to predict the likelihood that a contract will fail to be met should the quality of the physical link degrade. The probability that such a failure will not occur defines the commitment of the contract.

In a network having a multiplicity of different network sites as shown in FIG. 2 any flow would be controlled by a single FC wherever it is in the network. The FC organises handover and macrodiversity when it is informed by the CC that the quality of the current connection is degraded. Depending upon the number of flows carried by the network, the flows may be divided between a number of FCs operating in parallel.

Each location or network site in the network would have a CC. A 'location' could be a single base site or group of co-operating base sites. Base sites within the group would have the option of sharing resources, and the CC is the entity which is responsible for DCA.

Each CC will be associated with one or more MRMs. There will be one MRM for each different air interface or other type of transport media which is in use by the network in the location served by the CC. The CC is able to co-ordinate resource sharing between MRMs if that is permitted and would allow more efficient use of the resources. For example, one location may have macro, micro and pico cells. A single CC would co-ordinate these different systems at that location, but the different cells would have different MRMs. The CC could decide which air interface (ie, which cell) it was better to use. It could also, assuming the air interfaces were comparable, decide to move radio resources from one cell (and MRM) to another. Each MRM has control of the specific resources on that media in that area, and works autonomously using control algorithms such as link adaptation, adaptive modulation and APC to maintain the quality of the contracts assigned to it. This allows devolved control of air-interface specific techniques. If the MRM can no longer maintain the quality of the connections assigned to it even through the use of such algorithms, it informs the CC.

FIG. 2 shows the elements of the resource manager (RM) mapped on to a radio access network which for illustrative purposes is a hierarchical network. However the network structure does not require to be of the hierarchical type to benefit from use of the resource manager (RM). Such networks would consist of a number of radio cells, ranging from small pico cells, covering a building or part of a building, through a microcell which may cover one or more city blocks, to a macrocell which would have a radius of several kilometers. Each mobile terminal will have a link with a base station. The exact configuration of this link will be subject to link control functions like power control, but the actual allocation of resources at this lowest (link) level is, as detailed earlier, the responsibility of the Medium Resource Manager (MRM), with this entity arbitrating between users using a particular link.

Within a specific area, the radio resources used by different cells may interact with each other. As described above the Connection Controller (CC) controls this interaction, as well as having overall control of links through MRMs. The CC is responsible for allocating connections between MRMs if the quality delivered by the existing MRM degrades and the flow must be handed over to another MRM. The CC also controls the overall allocation of radio resource to MRMs so that the resources are used as efficiently as possible.

The highest level of control is formed by the Flow Controller (FC), which is responsible for a call wherever it is on a network. The FC moves the call between CCs, as appropriate, as the position of the mobile terminal changes.

Figure 3:
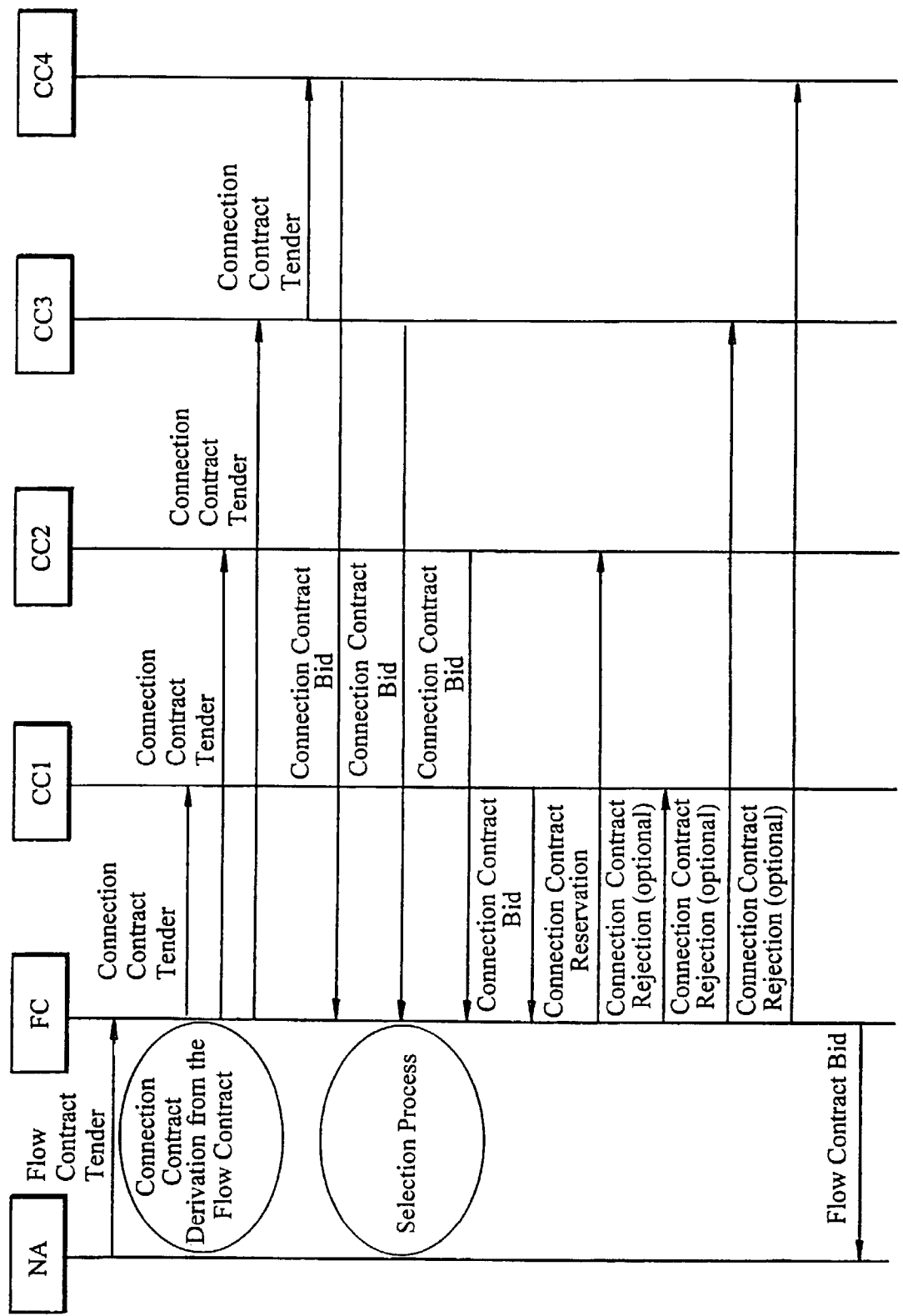
FIG. 3 shows an example of the interactions involved in the FIG. 1 management system in establishing a connection contract.

Operation of the management system which is shown in FIGS. 1 and 2 is as follows. The FC receives flows from the upper layers of the system. The FC would give a commitment to carry a flow on the network through the process of negotiating a flow contract. The flow contract gives detail of the service requirements, the required QoS, and the desired level of commitment (ie, the probability that the network will be able to meet the specified requirements on an ongoing basis without renegotiation). From the details given in the flow contract, FC derives a connection contract for example, as schematically illustrated in FIG. 3. A connection contract states what is to be delivered by a CC to a FC for a given connection in terms of QoS levels, where a connection is a link between a user terminal and a Base Station (BS). When the user is mobile, the flow will be handed over from BS to BS, therefore a flow is regarded as a sequence of connections. Once the connection contract has been specified, the FC tenders the contract among the CCs which have radio ports which may be able to provide coverage to the mobile. The CCs will then interrogate the MRMs of their radio ports to estimate the available resources and the resources which would be required to provide the requested service to the mobile. The MRMs will respond with connection options for their particular air interface, along with a level of commitment which is based on the available resources and the quality of the radio channel to the mobile. The CC will then choose the most suitable and cost effective options (in terms of radio resources which would be required to be allocated) and make a bid back to the FC to handle the flow. It will also pass the relevant commitment level. From the received bids, the FC will select the CC that will serve the user requirements with the lowest cost level bearing in mind the commitment offered.

It is possible for the CC to offer more than one connection option with different associated costs and commitments. This allows the system to trade-off commitment level against cost.

The contract defines QoS requirements in terms of the three generic quality measures (bit rate, delay and corruption). The contract defines each of these by setting statistical constraints over them. For example:

Mean is a constraint of the mean of the values. For example, bit_rate mean >9600 kb/s specifies that the mean of the bit rate must not be below 9600 kb/s.

Variance is a constraint on the variance of the values. For example bit_rate variance <0.02 means that the bit rate variance (or jitter) must not be above 0.02.

Percentile constrains a certain percentage of values. delay percentile 80<10 means the at least 80% of values must have a delay under 10 ms.

Frequency constrains the frequency of individual values or values in certain ranges. Delay Frequency 0.10)>80 means that at least 80% of all values must lie between 0 ms (inclusive) and 10 ms (exclusive).

In addition to the QoS requirements, the contract will also specify any measurement intervals, etc, for the values unless these have been agree in advance.

Each MRM maintains a resource data base, eg a table, which logs details of the resources used, the services which occupy them, and the channel quality for each available resource. The MRM uses this information to calculate resource availability, and to estimate the resources which would be required to service a connection.

If the quality of the link to the mobile falls, the MRM will take action as necessary to allocate further resources to the mobile and update its resource estimates. If the link can no longer be maintained with the available resources, the MRM will inform the CC, which will in turn renegotiate its contract with the FC. The FC then has the option of:

Adjusting its contract with the current CC, for example by reducing the required commitment or quality of service, or using more resources at a higher cost Re-tendering amongst different CC, which would result in a handover to a different radio port which could now provide the connection at lower cost. The re-tendering could take place with the same or different service requirements.

Terminating the call. The later option is only likely to be taken if re-tendering using the same or different options fails to obtain a suitable contract.

Looking at a specific scenario in terms of a user, at any given time the network will be supporting a plurality of users each having their own contract with their supplier. It is probable that each contract is different in terms of financial amount and therefore each offers different bands of service quality. Therefore a specific user with his specific contract may, during the course of a specific telephone call, find that the system is providing a performance level that is no longer optimal but in fact approaching a limit of some form due to the competing demands of the multiplicity of other users. In this case the management system instantaneously re-negotiates the contract for the specific user, essentially to say that if he is prepared to pay more money for this particular phone call the system will improve the level of service back toward optimal. The user does this utilising graphical interface tools for example as described with reference to FIGS. 6 and 7. If the user decides that he does want this upgrade immediately or has previously authorised such upgrades then it will be immediately provided by the management system. However, this in turn will mean that some or perhaps many of the multiplicity of other users will suffer some form of reduction in their quality of service, even to the extent of being cut off. In turn these users will be offered re-negotiated contracts. As the management system re-negotiates the multiplicity of contracts more or less simultaneously some users will refuse to accept a more expensive option than what is being delivered and in some cases this will result in users being cut off. There will also be some contracts which enable the management system to terminate the call in the event of the quality of the service falling below a predetermined level.

A main function of the management system is to provide a practical method to enable network operators to converge their communication technologies by enabling the flow controller (FC) to select the technology that will best serve the user requirements dynamically. In particular, it allows the high level control functions to chose between different air interface technologies and cell types in a cost effective manner in order to minimise resource use and the cost of providing the service. The division of the management functions between an FC, which is responsible for the flow wherever it is within the network, a CC, which is responsible for a specific link, and an MRM, which is responsible for a specific air interface, allows the devolution of air interface specific functions to low level entities. Thus it allows mapping of QoS parameters and commitment levels in a practical and achievable fashion.

FIG. 3 shows an example of the interactions between the Resource Manager entities for the establishment of a connection. In this example, a user is setting up a connection for a voice call in the centre of a city. The network which the user has subscribed to has a number of options for providing a radio link to the user. The link could be provided by a low power, short range pico cell, a higher power micro cell covering the neighbouring city blocks, or a larger macro cell covering that part of the city. It is also possible that the network may use satellite access as well. In the example, the network agent (NA) sends a request for a voice call to the network's FC which will control that call. The network agent (NA) will create a different contract request for each flow within the call. In a voice call, there would be one flow from the user to the network infrastructure, and one flow from the infrastructure to the user. Based on predictions, the FC calculates which CCs are in a position to serve the call, and tenders the contract to each of them. In this case, CC1 and CC3 are local micro cells, CC4 is a macro cell, and CC2 is a local pico cell. Each of these CCs calculates the cost of serving the contract on the commitment they can offer. The pico cell CC offers a low cost since the resources available in a small cell are smaller. However, the size of the cell means that commitment is likely to be lower. In this example, the user is more interested in low cost than high commitment, and CC2 is chosen for the call. CC1, CC3 and CC4 are informed that they have been unsuccessful, and the communications commence using CC2.

Figure 4:
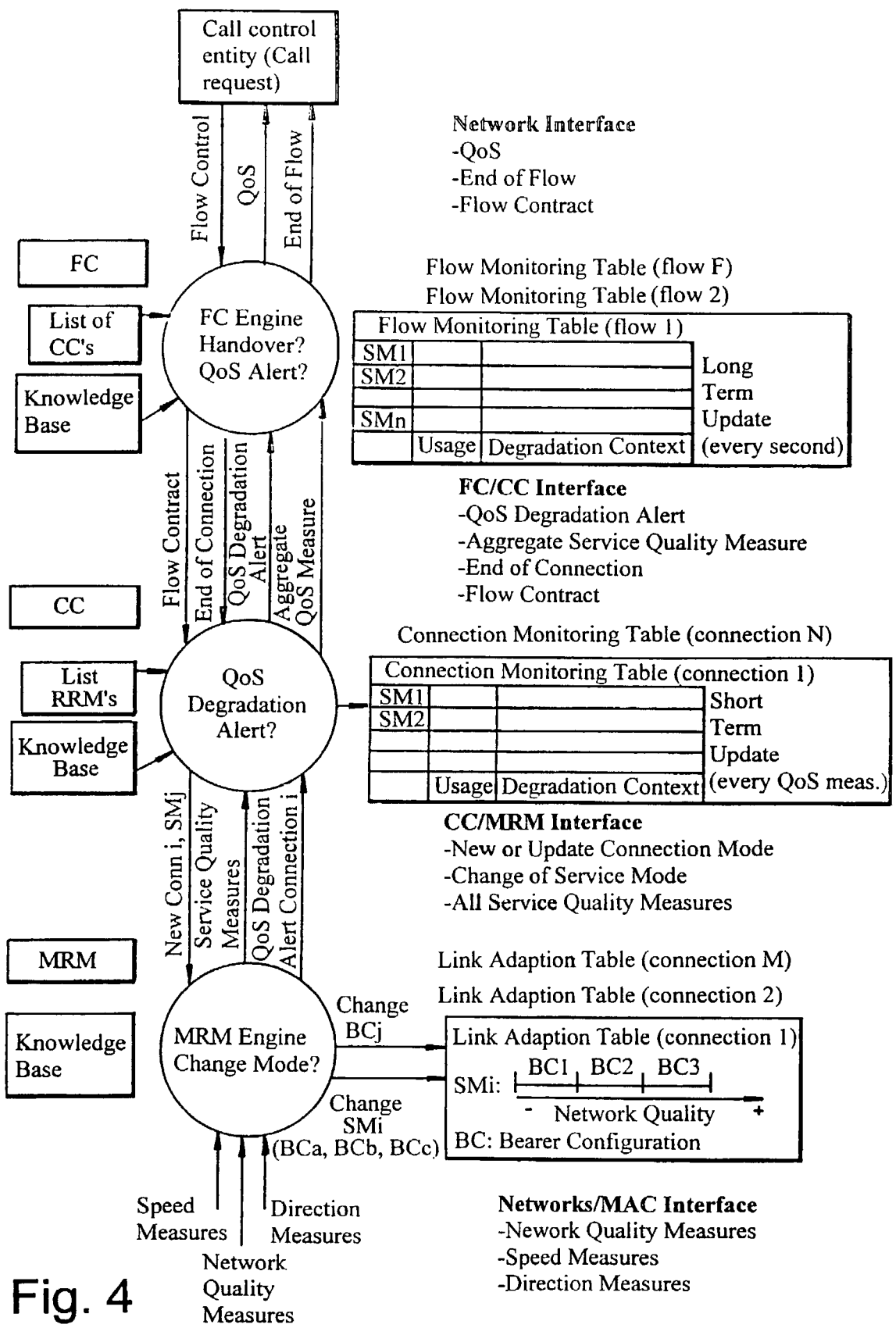
FIG. 4 shows a flow diagram of the operation of the resource manager of the FIG. 1 management system.

The operation of the management system is shown in more detail in FIG. 4. The flow controller (FC) receives a call request from the core network, or from a call control entity. This call request will contain a flow contract, specifying the traffic to be carried and the quality which must be maintained. When the call is complete, the flow controller (FC) will report to the call control entity the fact that the call has ended, as well as the quality which was achieved optionally, the FC may report to the call control entity that it will not be possible to maintain quality, allowing the call control entity the option of blocking the call (for a new call) or seeking an alternative network for the call.

Contracts passed to the flow controller (FC) are specified in terms of
  Bit rate: the minimum bit rate to be offered.
  BER: a maximum BER acceptable by the service.
  Delay: the maximum delay tolerated by the service.

These three primary performance parameters are complemented by three parameters which specify how rigidly the contracted parameters must be adhered to:
  Degradation Allowance: the proportion of measures which are allowed to be non-compliant with the three performance parameters over a sliding window.
  Sampling rate: the rate at which measures are performed.
  Monitoring Period: the length of the sliding window.

It is not necessary for these parameters to define fixed bounds. It is also possible to define a multi-mode contract which defines a number of different traffic flows and qualities to be maintained. By so doing, an application enables the network to vary the traffic to meet the channel quality experienced. As a consequence more flexibility is given to the network which might result in lower charges. Each mode in a multi-mode contract is called a Service Mode (SM), and the FC maintains a record of the proportion of time spent in each SM.

The FC has a resource data base, eg list, of Connection Controllers (CC) available to it, along with a knowledge base of their locations, capabilities, current traffic loads, etc. In addition, the FC maintains a list of active contracts in a Flow Monitoring Table, which it updates to maintain a record of the achieved quality. Should quality begin to degrade, the FC will seek an alternative CC to carry the call, based on its knowledge of the location of the terminal and the capabilities of relevant CCs.

The CC operates in a similar manner but is responsible only for calls within a specified area. The CC is allocated calls by the FC, and passes these connections to a MRM under its control on the basis of traffic load on the MRMs and their reported quality and capacity estimates. The CC maintains a knowledge base, ie a resource data base, of its MRMs and their loading. It also receives reports from each MRM of its expected loading, based on the connections it currently has and the channel quality it is currently experiencing. The CC monitors the quality of the connections within its control and switches connections between MRMs, as required, to maintain their quality. The CC can also switch radio resources between MRMs within its area to maintain quality targets.

If a MRM alerts the CC that quality cannot be met for one of its connections, then the CC has several alternatives:
  It can hand over the connection to another MRM, as information about other MRM performance is maintained in the CC knowledge base.
  It can release some resources from other connections by changing their service modes or, in the extreme situation, drop low priority connections.
  It can change the service mode of the connection to a service mode which requires fewer resources (this option is available only in the case of multi-mode contracts).

If the CC cannot cope with the degradation then it alerts the FC (QoS Degradation). The CC forwards aggregate service quality measures to the FC.

A MRM controls resources on a single link of the system, monitors the quality on the connection or connections allocated to it, and uses link control functions such as power control or changes in channel coding to maintain the necessary quality. With its knowledge of the traffic loading on the link and the current radio quality of the link, the MRM reports an estimate of available capacity to the CC so that the CC has the option of allocating more connections should resources be available, or of moving connections elsewhere if available resources fall below a specific threshold. A MRM receives low level measurements on mobile speed and direction as well as radio link quality in order to make these predictions. A MRM can control the transmission mode—the configuration of the air interface with respect to channel coding, interleaving, power, etc—and may change this to maintain quality. Changing the air interface configuration will effect the remaining resources available at the MRM, and will be reported to the CC accordingly, as will any changes in radio quality which are beyond the capability of mode changes to deal with. The RRM is not aware of the contract mode usage constraints specified in the multi-mode contract and is only aware of one contract operating mode at a time. The RRM is responsible only for the change of bearer configuration and is not responsible for the change of contract mode (CC's responsibility).

For QoS monitoring, the mobile station is usually responsible for the monitoring of the downlinks whereas the base station is usually responsible for the monitoring of the uplinks.

Quality of Service is actually communicated between the FC, CC and MRM entities in terms of commitment. Commitment is the probability that the required quality will be met over the agreed monitoring period and is very important to the resource manager as it allows a consistent method of trading quality guarantees against the cost of providing them.

Analysis has been performed by simulation of a TETRA digital private mobile radio system. The system is easily scaleable for future cellular systems with higher bit rates, but TETRA with 10 Km cells provides a good example of a current system with a very diverse set of bearers and QoS requirements which makes control difficult without the management system outlined herein.

Figure 5:
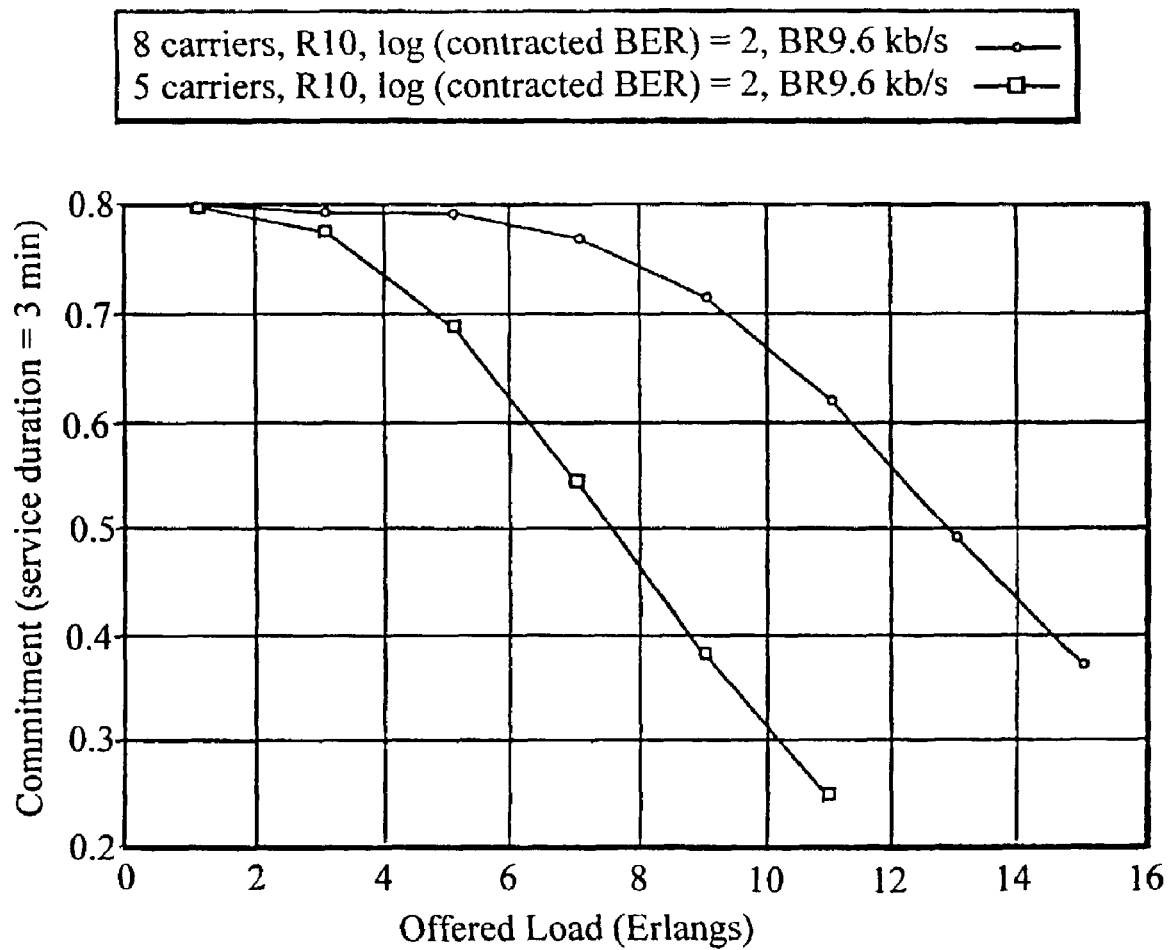
FIG. 5 shows a graphical representation of the effect on commitment of increasing users in a communications system according to the present invention.

FIG. 5 shows the effect of increasing the number of users ie the Offered Load in a cell for two cases, one with 5 TETRA carriers (19 user slots) and the other with 8 carriers (31 user slots). The service chosen, 9.6 kb/s data with low delay and 1% residual BER, requires between 2 and 4 slots depending on channel conditions and the bearers used. In both cases, providing a commitment of 75% limits the number of users to roughly half that of a commitment level of 60%. The cost for a commitment of 75' in such a system would therefore be twice that of a commitment of 60%, for example. In general, the highest commitment is delivered by reserving the most robust bearer all the time, although this would be a costly option.

FIG. 6 illustrates a graphical interface of 'Expert Mode' tools which experienced users will be willing to use. Inexperienced users will prefer much simpler or 'Basic Mode' tools such as depicted by FIG. 7. These simpler tools do not have the ability to describe a detailed level of QoS but have the advantage of being easy to manipulate.

The FIG. 6 tools could be used by service providers and experienced users as follows:

The Application Type area enables the user to choose from a section of application types. Selecting one of them automatically sets-up values over the quality scales of Audio, Video, Data and Synchronisation areas. The Non-Performance Properties area enables the user to set up nonperformance constraints such as the maximum price to be associated with the session, the performance commitment requested, the software and hardware terminal capabilities. The three middle areas Audio, Video and Data are used for specifying constraints over the various flows composing the session. The Synchronisation area enables the specification of synchronisation constraints between the video, audio and/or data flows.

The FIG. 7 tools will only enable the specification of a price constraint and of an overall level of quality.

The invention claimed is:

1. A mobile communications system comprising a radio access network having a multiplicity of network sites, and a traffic flow management system for controlling the routing of traffic flows through the network, wherein the management system is adapted to trade resources at the various network sites against a plurality of user Quality of Service parameters to achieve required contractual levels of commitment to a multiplicity of mobile users as defined in a user contract, wherein the management system has a Networks Layer organized as a hierarchical structure of three separate entities including a Flow Controller (FC) entity responsible for flow within the network, a plurality of Connection Controller (CC) entities each responsible for a specific link, and a plurality of Medium Resource Manager (MRM) entities, each MRM entity being responsible for a specific air interface, and wherein the FC is configured to tender the user contract among the CCs and, in response to tendering of the user contract, the CCs are configured to interrogate the MRM entities to estimate available resources and resources required to provide a requested service to the user; the MRM entities are configured to respond to the CC entities with air interface connection options along with a level of commitment based on the available resources and radio channel quality to a mobile device of the user; wherein the CC entities choose a most suitable and cost effective option and make a bid back to the FC entity to handle the flow, whereupon the FC entity selects the CC that serves the user requirements with a lowest cost level taking into account the commitment offered.

2. A mobile communications system as claimed in claim 1 wherein the management system is arranged so that when a request for a traffic flow is received by the FC entity which will control the traffic flow, the FC entity tenders the user a contract to each CC entity available to serve the FC entity, each available CC entity calculates the capability to serve the user contract and the level of commitment which can be given and uses this to provide the FC entity with a bid for the user contract, the FC entity then selects the most suitable bid, and therefore CC entity, to serve the terms of the request.

3. A mobile communications system as claimed in claim 1 wherein commitment is a probability that the required quality of service parameters will be met.

4. A mobile communications system as claimed in claim 1 wherein commitment is a probability that the required quality of service parameters will be met, and wherein each MRM entity is adapted to respond with connection options for its particular air interface, along with a level of commitment based on available resources and the quality of the radio channel to the mobile device.

* * * * *